United States Patent [19]

Gibble et al.

[11] 3,927,449
[45] Dec. 23, 1975

[54] FORMED ONE-PIECE HOLLOW ROLLER SHAFT

[75] Inventors: Lawrence W. Gibble; Dennis Lee Keesey, both of York, Pa.

[73] Assignee: Caterpillar Tractor Co., Peoria, Ill.

[22] Filed: Dec. 3, 1973

[21] Appl. No.: 421,120

[52] U.S. Cl... 29/148.4 D; 29/DIG. 11; 29/DIG. 18; 29/DIG. 24; 29/DIG. 47; 72/267
[51] Int. Cl.² .................... B21H 1/14; B21K 1/02
[58] Field of Search .......... 29/148.4 D, 417, DIG. 7, 29/DIG. 11, DIG. 18, DIG. 26, DIG. 24, DIG. 34, DIG. 36, DIG. 41, DIG. 47; 72/267

[56] References Cited
UNITED STATES PATENTS

| | | | |
|---|---|---|---|
| 1,642,696 | 9/1927 | Rateike | 72/267 |
| 2,061,300 | 11/1936 | Daniels | 29/148.4 D X |
| 2,371,716 | 3/1945 | Snell | 29/DIG. 47 |
| 2,472,261 | 6/1949 | Mueller | 29/DIG. 24 |
| 2,593,069 | 4/1952 | Steinmetz | 29/148.4 D |
| 3,672,038 | 6/1972 | Lombard | 29/DIG. 36 |
| 3,737,965 | 6/1973 | Knapp | 29/DIG. 47 |
| 3,780,555 | 12/1973 | Balthazar | 72/370 X |

FOREIGN PATENTS OR APPLICATIONS

| | | | |
|---|---|---|---|
| 1,180,106 | 2/1970 | United Kingdom | 72/267 |
| 1,199,085 | 7/1970 | United Kingdom | 72/267 |

*Primary Examiner*—C. W. Lanham
*Assistant Examiner*—V. K. Rising
*Attorney, Agent, or Firm*—Phillips, Moore, Weissenberger Lempio & Strabala

[57] ABSTRACT

A method of forming an article in the form of a one-piece, hollow, elongated body having an enlarged center portion and narrowed or necked down end portions is provided. The method is shown as applied to forming a hollow roller shaft having an internal, centrally disposed lubricant cavity within a central body and a pair of shaft journals extending therefrom.

18 Claims, 12 Drawing Figures

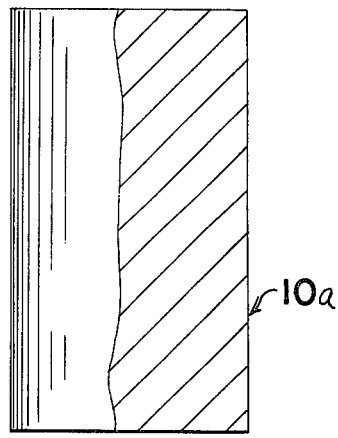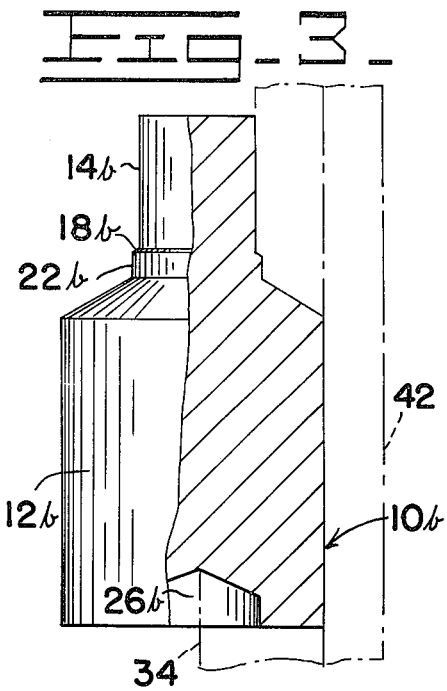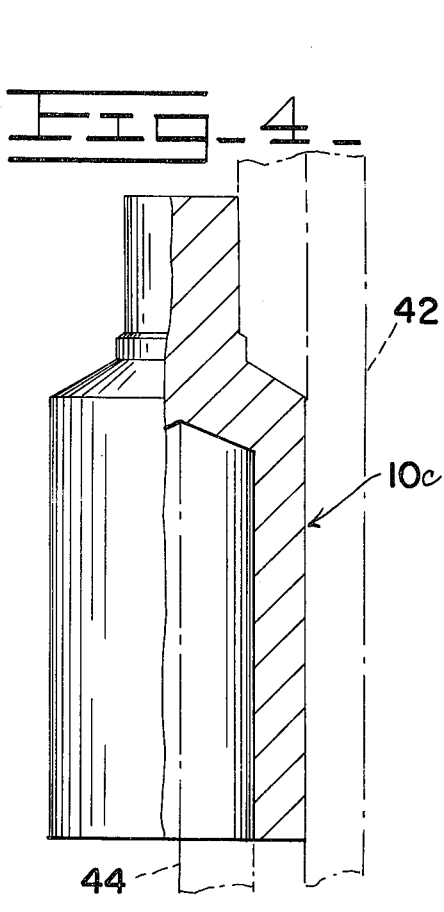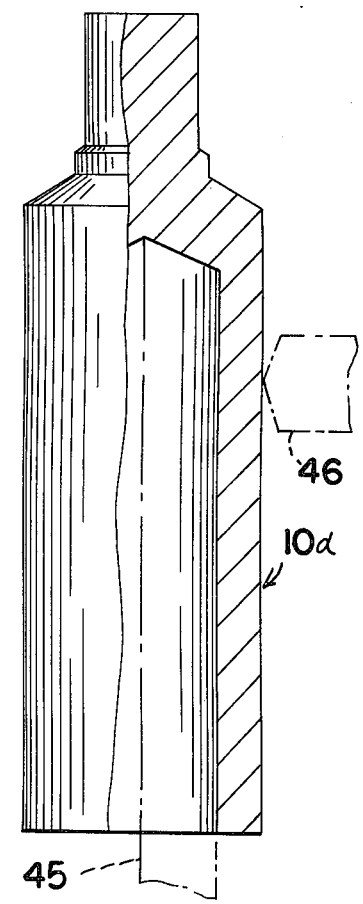

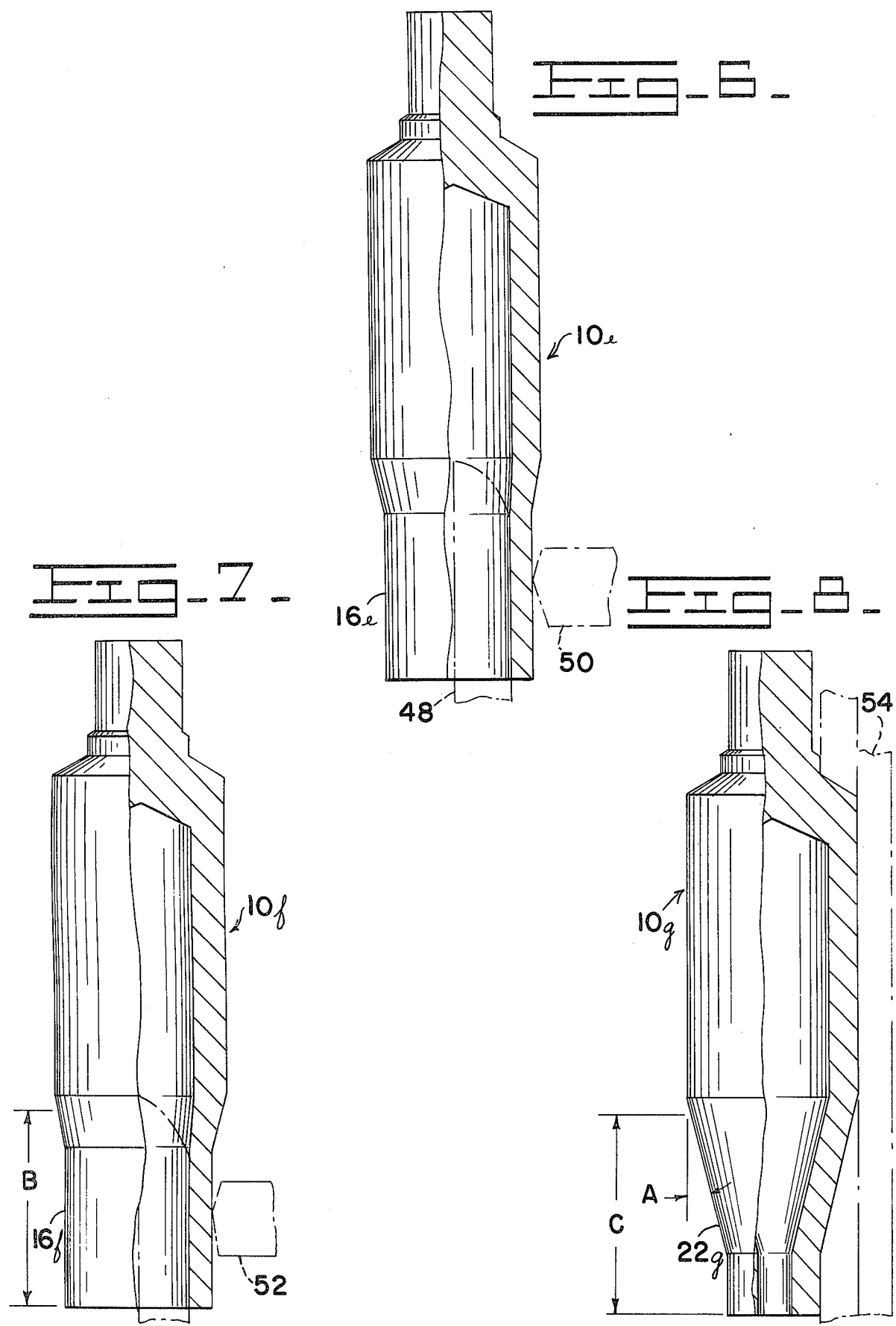

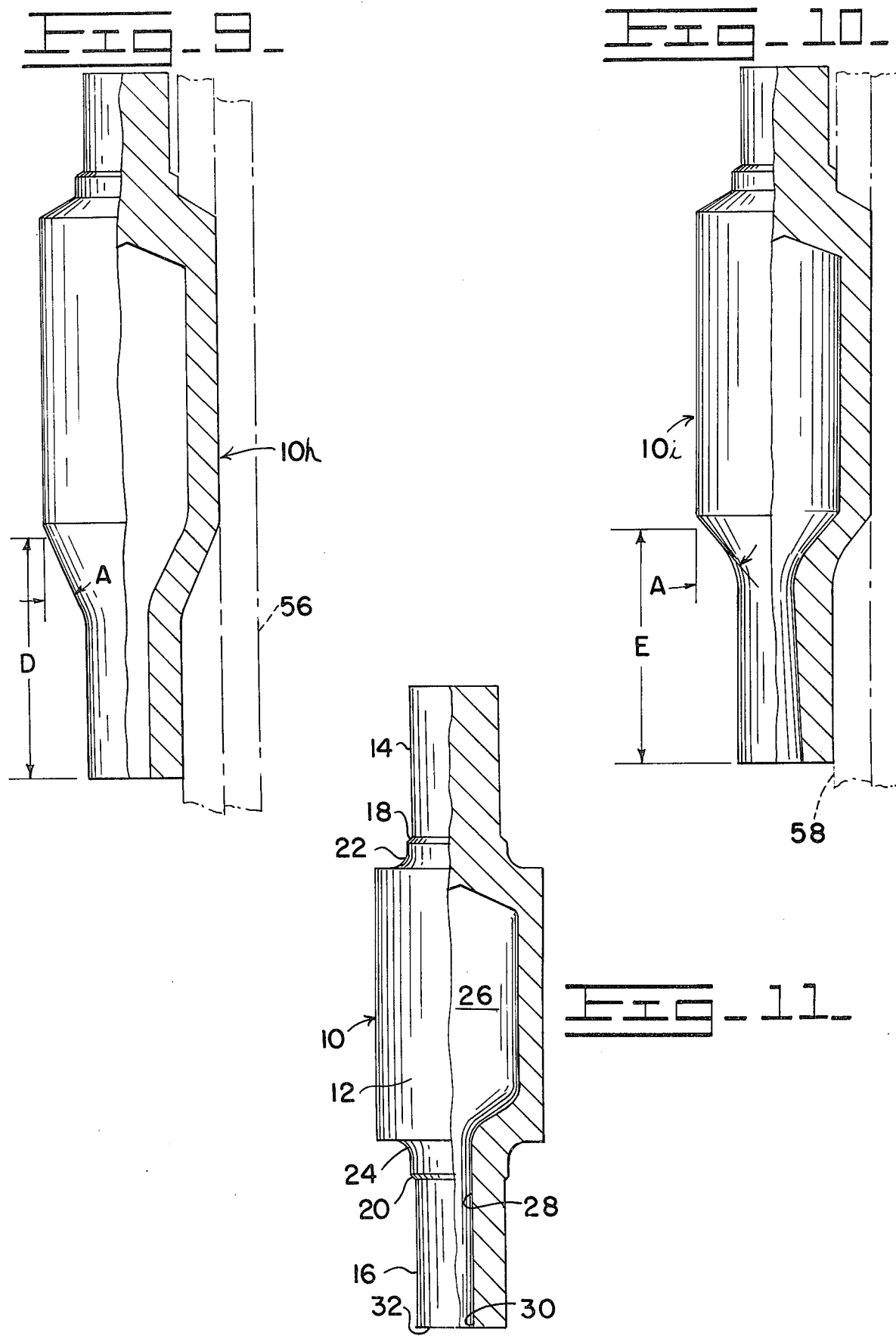

FORMED ONE-PIECE HOLLOW ROLLER SHAFT

BACKGROUND OF THE INVENTION

This invention relates to the method of forming an article in the form of a one-piece, hollow member having an enlarged center portion and narrowed or necked down end portions.

More particularly, this invention is directed to forming a hollow, one-piece shaft having an enlarged center portion and necked down end portions from a metal slug. While the following discussion concerns hollow shaft rollers, it is to be understood that this is for convenience only, and that other articles of varying shapes and applications can be formed by the method of this invention.

Prior to the advent of this invention, hollow roller shafts, as shown in U.S. Pat. Nos. 1,911,171; 2,054,532; 2,283,871; 2,349,898; 2,362,443; 2,647,025; 2,690,933; and 2,926,968, were manufactured by various methods. Principally, these methods involve casting with subsequent machining or forming with subsequent machining. Some involve additional steps of welding and finish machining where individual parts are combined to form the finished roller shaft. The formation of the external dimensions as well as the internal hollow or chamber, frequently internal cavities used as lubricant reservoirs, is costly both in time and materials. In addition, other disadvantages of the prior art include the presence of unrelieved residual stresses in the completed shafts that materially reduce strength and consequent wear life.

It is to an elimination of these disadvantages of the prior art that this invention is directed. The invention provides a method of forming and an article in the form of a generally cylindrical, hollow roller shaft having an intermediate enlarged portion and being of unitary, one-piece construction. The method is practiced by beginning with a metal slug and cleaning, coating with lubricant, heating and forming on a press by a series of forming operations. These forming operations include: pre-forming; backward extruding; drawing; re-drawing; nosing and coining. Intermediate steps are provided which include: annealing including local heat application; cleaning and coating.

It is therefore the primary object of this invention to provide a method of making a formed, one-piece hollow member having an enlarged center portion.

It is a further object of this invention to provide an article in the form of a formed, one-piece hollow roller shaft which has reduced residual stresses and increased wear and resistance to load failure.

It is a further object of this invention to provide a method of forming a hollow elongated member having an enlarged center portion and narrowed portions at opposite ends thereof.

It is a further object of this invention to provide a method of forming a hollow shaft of one-piece construction having stepped end portions.

It is a further object to provide a method of forming a hollow reservoir in a one-piece shaft by starting with a solid slug.

It is a still further object to provide a method of forming a hollow shaft to closely controlled tolerences and having a minimum of inherent residual stress.

Other objects and advantages of the present invention will become apparent upon having reference to the accompanying drawings and the following description.

BRIEF DESCRIPTION OF THE DRAWINGS

FIG. 2 is a side elevational view of a bar stock blank in partial cross-section which is employed in the subsequent forming steps;

FIG. 3 is a side elevational view in partial cross-section of the blank of FIG. 2 after an initial pre-forming operation;

FIG. 4 is a side elevational view in partial cross-section of the blank after a backward extrusion operation;

FIG. 5 is a side elevational view in partial cross-section of the blank after a drawing operation;

FIG. 6 is a side elevational view in partial cross-section of the blank after a first re-drawing operation;

FIG. 7 is a side elevational view in partial cross-section of the blank after a second re-drawing operation;

FIG. 8 is a side elevational view in partial cross-section of the blank after a first nosing operation;

FIG. 9 is a side elevational view in partial cross-section of the blank after a second nosing operation;

FIG. 10 is a side elevational view in partial cross-section of the blank after a third nosing operation;

FIG. 11 is a side elevational view in partial cross-section of the blank after a final coining operation; and, FIG. 12 is an elevational view in partial cross-section of a hydraulic press engaged in a forming operation.

DETAILED DESCRIPTION

Figure 1:
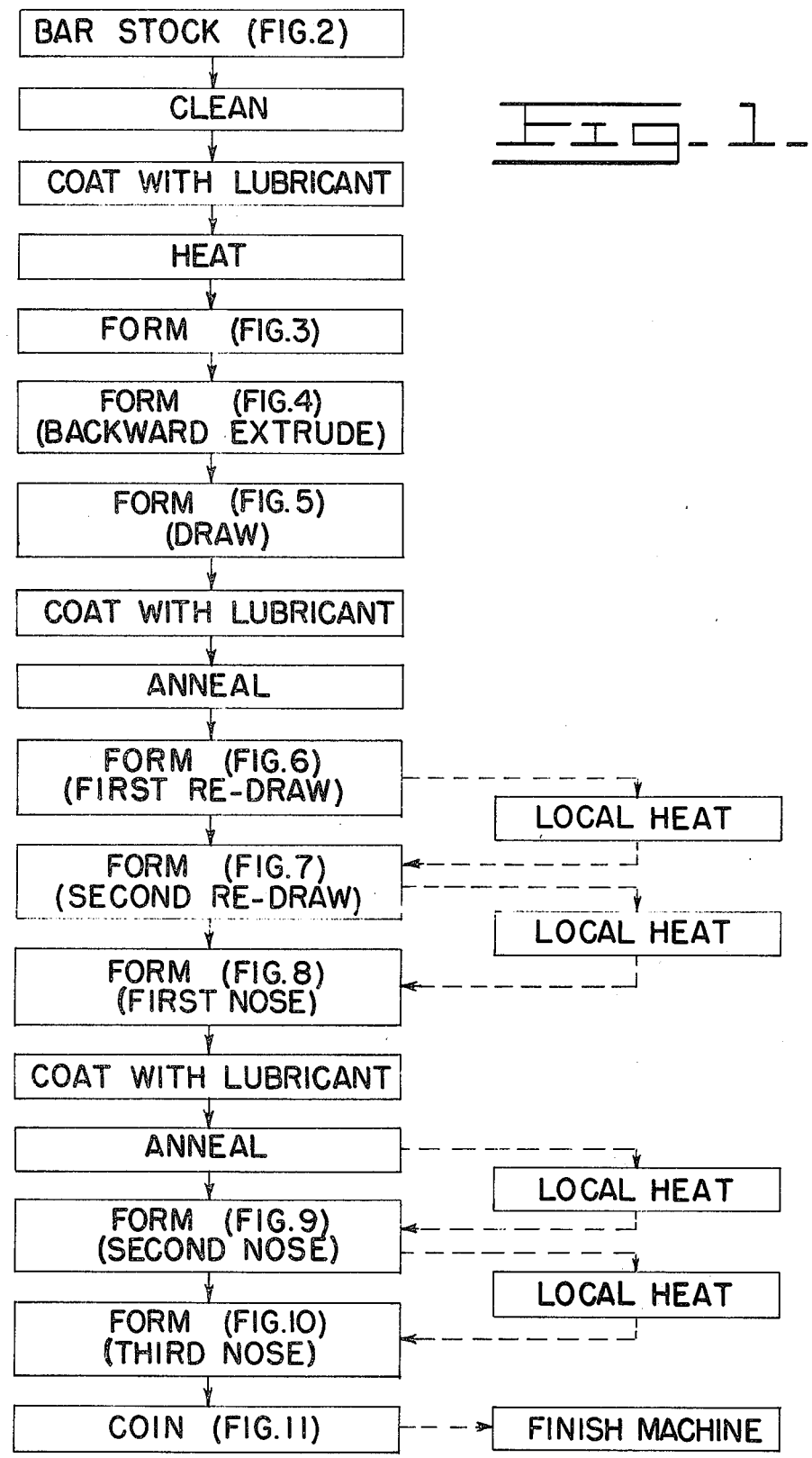
FIG. 1 is a schematic diagram of the method steps in forming a hollow, one-piece roller shaft.

Turning to the drawings and in particular FIG. 1, there is shown in schematic form the method steps used to produce the hollow roller shaft shown in FIG. 11. As seen in the latter FIGURE, the shaft or member 10 thus produced is an elongated member having a cylindrical central body portion 12 and narrowed or necked down cylindrical end or journal portions 14, 16. The transition between the end or journal portions and the body portion is made by a chamfer 18, 20 and a curved portion 22, 24, respectively. Formed within the body portion is a generally cylindrical, centrally disposed internal hollow or cavity 26. The purpose of the cavity is to be a reservoir for storage of lubricant for transmission to the shaft journal portions by way of lubricant passages therein (not shown). A fill passage 28 connects the cavity with the shaft exterior to facilitate filling through a plug or other valve means (not shown) which is provided to close opening 30 in the end 32 of the shaft.

The steps of manufacture of the shaft are as follows. First, a solid cylindrical slug or blank 10a as shown in FIG. 2 is provided such as by cutting off a length of material from a piece of bar stock. Suitable material would be carbon steel, e.g. S.A.E. 1042 carbon steel.

Second, the blank is cleaned to remove scale, oxidation, and surface contamination. Cleaning may be accomplished by shot peening the blank and may be followed by washing in water with a commercial soap solution to remove any surface contamination such as residual oil or other lubricant.

Third, the cleaned blank is coated with a lubricant. Dipping or otherwise immersing the cleaned blank in a commercially available collodial graphite compound has been found to be sufficient to reduce surface friction and prevent bonding during subsequent forming operations. Other suitable lubricants may also be used.

Figure 12:
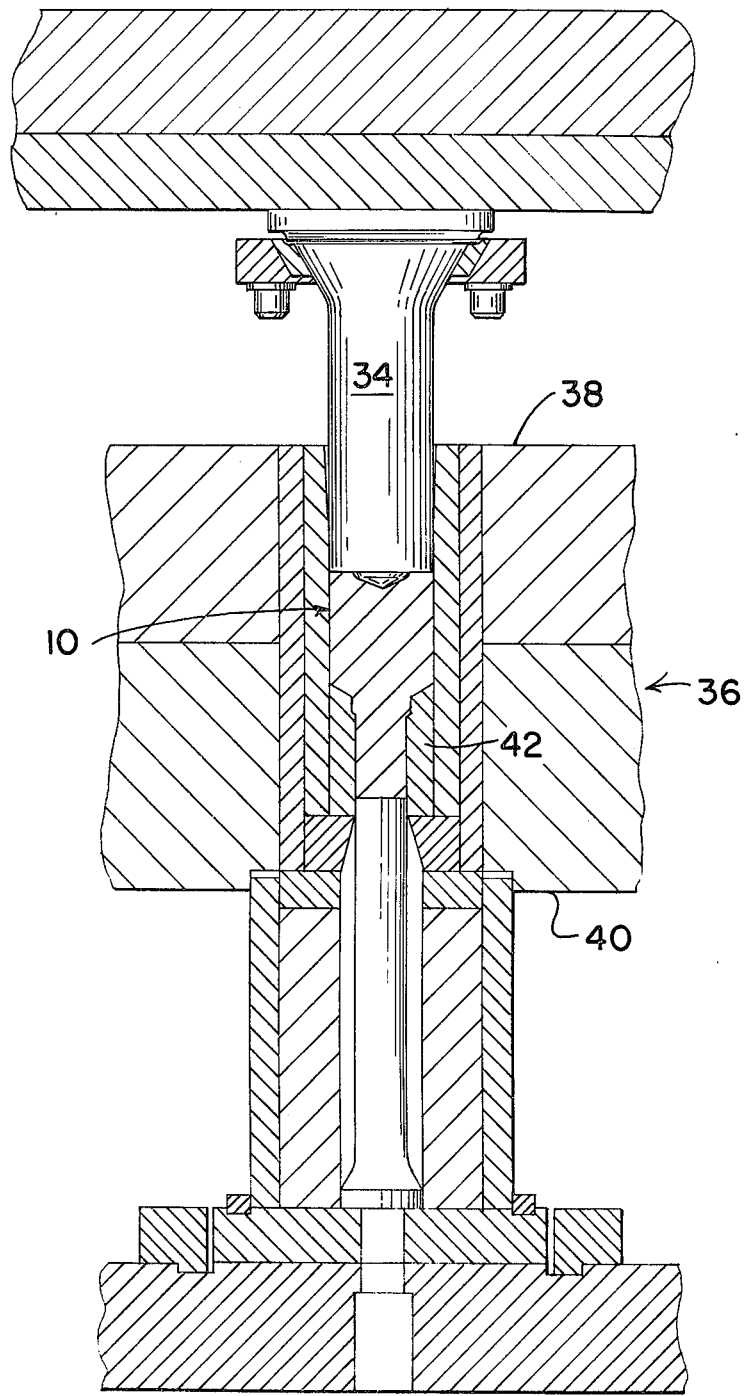

After coating, heating of the cleaned and coated blank is accomplished. The slug is heated in a furnace to a temperature of approximately 1400°F. The heated slug is then removed and placed in a press such as shown in FIG. 12, employing a conventional punch 34 and die assembly 36 comprising die blocks 38, 40 and die 42.

The heated blank is then formed to a pre-form shape as seen in FIG. 3 having journal portion 14b, transition portions 18b, 22b, and body portion 12b. The punch end also forms cavity 26b.

The punch is then indexed and replaced by a centrally disposed cylindrical mandrel 44 having a diameter equal to the desired cavity diameter. The step of backward extrusion of the still heated pre-formed blank is then accomplished to form the shape shown in FIG. 4.

Mandrel 44 is then withdrawn and replaced by a slightly smaller diameter mandrel 45. The member 10d is then drawn through an extrusion die 46. This drawing operation reduces the wall thickness and elongates the member 10d as seen in FIG. 5. This operation also establishes the nominal internal and external diameters of the finished shaft. After this, the partially formed shaft is coated with lubricant in the manner aforementioned and annealed by heating to a temperature of approximately 1400°F.

The mandrel is then indexed and replaced with a mandrel 48 having a diameter slightly less than that of mandrel 45 and the member drawn through successively smaller forming dies 50, 52, as seen in FIGS. 6 and 7, respectively. These first and second re-drawing operations produce a reduced end portion 16e, 16f, as shown in FIGS. 6 and 7, respectively.

The member 10g is then formed by nosing in an appropriately shaped die piece 54 to produce a portion 22g having a taper angle A of approximately 13° as seen in FIG. 8. After re-coating with lubricant and annealing at 1400°F in the manner aforementioned, the taper is incrementally increased by second and third nosing operations in successive die pieces 56, 58, to produce taper angles A of 23° and 40°, respectively.

The member is then pressed into its final configuration as shown in FIG. 11, by a coining operation. If necessary, finish machining to final tolerances can then optionally be accomplished, as indicated by dotted lines in FIG. 1.

The article thus provided is a formed, one-piece hollow roller shaft of integral, one-piece and homogenous construction. The forming of the shaft provides reduced residual stresses as well as increased wear and resistance to load failure.

As also indicated in the same manner, intermediate localized heating steps can also be performed prior to the second re-draw operation and before the nosing operations, in order to facilitate these operations. The local heating may be conveniently accomplished by heating all around the member with a torch in the areas B, C, D and E, as seen in FIGS. 7–10, respectively.

Although the invention has hereinbefore been described and illustrated in the accompanying drawings with respect to a specific application, various modifications and changes may be made therein without departing from the scope and spirit of the invention, and thus it is not intended to limit the invention except by the terms of the appended claims.

What is claimed is:

1. A method of manufacturing a member in the form of a generally cylindrical roller having an enlarged generally cylindrical center portion defining a first diameter, and necked down end portions extending from opposite ends of said center portion, said end portions each being of generally cylindrical configuration and defining a second diameter smaller than said first diameter, and further defining an internal cavity, and relatively thick walls between the cavity and the roller exterior comprising in sequence the steps of:

a. providing a blank,
   b. heating the blank, and
   c. forming the blank by pressing it in a die into a preform shape having an enlarged center portion, a first necked down end portion, and a cavity in the blank opposite said first necked down end portion,
   d. further forming by pressing to elongate the enlarged center portion and enlarge the cavity,
   e. forming by pressing the end of the blank opposite the first necked down end into a second necked down end portion, thereby defining an enlarged central body portion intermediate the necked down end portions having an enlarged internal cavity therein.

2. The method of claim 1 wherein the step of forming to elongate comprises backward extruding to elongate the blank and enlarge the cavity therein.

3. The method of claim 2 wherein the step of forming to elongate further includes the step of drawing to further elongate the blank and enlarge the cavity therein.

4. The method of claim 3 wherein the step of forming to elongate further includes the step of re-drawing the blank to further elongate the blank.

5. The method of claim 1 wherein the step of forming the end of the blank opposite the first necked down end portion into a second necked down end portion comprises a first step of nosing the blank by pressing in a die.

6. The method of claim 5 further including the steps of coating the blank with lubricant and annealing to relieve working stresses.

7. The method of claim 6 wherein the step of nosing further comprises further second and third steps of nosing.

8. The method of claim 7 wherein the step of forming further comprises coining the blank to define the final form.

9. The method of claim 8 further including the step of finish machining the formed blank to final dimensional tolerances.

10. The method of claim 1 wherein the step of further press forming to elongate the enlarged center portion comprises successive first and second steps of re-drawing the blank to produce a progressively longer blank.

11. The method of claim 10 further including the step of locally heating the end portion of the blank opposite the first necked down end.

12. The method of claim 5 wherein nosing comprises a successive plurality of nosing steps to produce a progressively greater transition angle between the central body portion and the second necked down end.

13. The method of claim 12 wherein the plurality of nosing steps are three.

14. The method of claim 7 further including the steps of locally heating the second necked down end portion of the blank to facilitate forming prior to the second and third steps of nosing.

15. The method of claim 5 further including the antecedent step of locally heating the end portion of the blank opposite the first necked down end.

16. The method of claim 1 further including the steps of cleaning and coating the blank with lubricant prior to the step of heating.

17. The method of claim 4 further including the antecedent steps of coating the blank with lubricant and annealing to relieve working stresses.

18. The method of claim 5 wherein the member is a generally cylindrical shaft, the necked down end portions comprise generally cylindrical first and second journal portions, and wherein nosing the blank forms both an internal cavity suitable for storage of lubricant within said center portion, and further forms a generally axially disposed fill passage in said second journal portion intercommunicating the cavity with the exterior of said draft.

\* \* \* \* \*